(12) United States Patent
Moore

(10) Patent No.: US 7,711,694 B2
(45) Date of Patent: May 4, 2010

(54) SYSTEM AND METHODS FOR USER-CUSTOMIZABLE ENTERPRISE WORKFLOW MANAGEMENT

(75) Inventor: Dennis B. Moore, Burlingame, CA (US)

(73) Assignee: SAP AG, Walldorf (DE)

( * ) Notice: Subject to any disclaimer, the term of this patent is extended or adjusted under 35 U.S.C. 154(b) by 1254 days.

(21) Appl. No.: 10/628,824

(22) Filed: Jul. 28, 2003

(65) Prior Publication Data

US 2004/0122853 A1    Jun. 24, 2004

Related U.S. Application Data

(60) Provisional application No. 60/471,298, filed on May 16, 2003, provisional application No. 60/436,219, filed on Dec. 23, 2002.

(51) Int. Cl.
*G06F 7/00* (2006.01)
(52) U.S. Cl. .................. 707/103 R; 707/104.1
(58) Field of Classification Search ............. 707/103 R, 707/104.1
See application file for complete search history.

(56) References Cited

U.S. PATENT DOCUMENTS

| | | | |
|---|---|---|---|
| 5,634,127 A * | 5/1997 | Cloud et al. ................. | 719/313 |
| 5,721,906 A | 2/1998 | Siefert | |
| 5,754,939 A | 5/1998 | Herz et al. | |
| 5,802,499 A | 9/1998 | Sampson et al. | |
| 5,826,239 A * | 10/1998 | Du et al. ....................... | 705/8 |
| 5,870,545 A * | 2/1999 | Davis et al. .................. | 709/201 |
| 5,893,074 A * | 4/1999 | Hughes et al. ................ | 705/8 |
| 5,899,979 A * | 5/1999 | Miller et al. .................. | 705/9 |
| 6,003,011 A | 12/1999 | Sarin et al. | |
| 6,052,684 A * | 4/2000 | Du ................................ | 707/8 |
| 6,078,982 A * | 6/2000 | Du et al. ...................... | 710/200 |
| 6,167,564 A | 12/2000 | Fontana et al. | |
| 6,185,587 B1 | 2/2001 | Bernardo et al. | |
| 6,189,003 B1 | 2/2001 | Leal | |
| 6,233,600 B1 | 5/2001 | Salas et al. | |
| 6,278,977 B1 * | 8/2001 | Agrawal et al. ................ | 705/7 |
| 6,297,819 B1 | 10/2001 | Furst | |
| 6,327,628 B1 | 12/2001 | Anuff et al. | |
| 6,473,751 B1 | 10/2002 | Nikolovska et al. | |
| 6,484,149 B1 | 11/2002 | Jammes et al. | |
| 6,636,837 B1 | 10/2003 | Nardozzi et al. | |
| 6,643,661 B2 | 11/2003 | Polizzi et al. | |
| 6,668,273 B1 | 12/2003 | Rust | |

(Continued)

OTHER PUBLICATIONS

PCT International Search Report, mailed Mar. 10, 2005 (3 pages).

(Continued)

*Primary Examiner*—Wilson Lee
*Assistant Examiner*—Michael Le
(74) *Attorney, Agent, or Firm*—Finnegan, Henderson, Farabow, Garrett & Dunner, L.L.P.

(57) ABSTRACT

Systems and techniques to manage work related procedures. In general, in one implementation, the techniques include providing a user-interface with a user-selectable list of work-items, each work-item having metadata describing a pre-defined user-selectable list of guided procedures associated with the work-item, receiving a response that includes a selected work-item and selected guided procedures, and triggering the selected guided procedures associated with the selected work-item.

39 Claims, 7 Drawing Sheets

U.S. PATENT DOCUMENTS

| | | |
|---|---|---|
| 6,668,353 B1 | 12/2003 | Yurkovic |
| 6,697,865 B1 | 2/2004 | Howard et al. |
| 6,820,082 B1 | 11/2004 | Cook et al. |
| 6,871,197 B1 | 3/2005 | Johnson |
| 6,912,573 B2 | 6/2005 | Ohkado et al. |
| 6,915,482 B2 | 7/2005 | Jellum et al. |
| 6,950,852 B1 | 9/2005 | Kobayaghi et al. |
| 6,959,268 B1 | 10/2005 | Myers, Jr. et al. |
| 7,003,546 B1 | 2/2006 | Cheah |
| 7,003,550 B1 | 2/2006 | Cleasby et al. |
| 7,054,923 B2 | 5/2006 | Krishnamoorthy |
| 7,124,355 B1 | 10/2006 | Kukkal |
| 7,139,978 B2 | 11/2006 | Rojewski et al. |
| 7,222,369 B2 | 5/2007 | Vering et al. |
| 7,277,924 B1 | 10/2007 | Wichmann et al. |
| 7,340,679 B2 | 3/2008 | Botscheck et al. |
| 7,392,254 B1 | 6/2008 | Jenkins |
| 7,424,438 B2 | 9/2008 | Vianello |
| 7,448,046 B2 | 11/2008 | Navani et al. |
| 2001/0047293 A1 | 11/2001 | Waller et al. |
| 2002/0049749 A1 | 4/2002 | Helgeson et al. |
| 2002/0052894 A1 | 5/2002 | Bourdoncle et al. |
| 2002/0059379 A1 | 5/2002 | Harvey et al. |
| 2002/0073114 A1 | 6/2002 | Nicastro et al. |
| 2002/0087600 A1 | 7/2002 | Newbold |
| 2002/0111787 A1 | 8/2002 | Knyphausen et al. |
| 2002/0138331 A1 | 9/2002 | Hosea et al. |
| 2003/0023662 A1 | 1/2003 | Yaung |
| 2003/0023677 A1 | 1/2003 | Zuill et al. |
| 2003/0046401 A1 | 3/2003 | Abbott et al. |
| 2003/0078830 A1 | 4/2003 | Wagner et al. |
| 2003/0130994 A1 | 7/2003 | Singh et al. |
| 2003/0135559 A1* | 7/2003 | Bellotti et al. ............ 709/206 |
| 2003/0154180 A1 | 8/2003 | Case et al. |
| 2004/0088315 A1 | 5/2004 | Elder et al. |
| 2004/0098467 A1 | 5/2004 | Dewey et al. |
| 2004/0119738 A1 | 6/2004 | Beringer et al. |
| 2004/0119752 A1 | 6/2004 | Beringer et al. |
| 2004/0122693 A1 | 6/2004 | Hatscher et al. |
| 2004/0122696 A1 | 6/2004 | Beringer |
| 2004/0122853 A1 | 6/2004 | Moore |
| 2004/0128156 A1 | 7/2004 | Beringer et al. |
| 2004/0131050 A1 | 7/2004 | Beringer et al. |
| 2004/0133413 A1 | 7/2004 | Beringer et al. |
| 2005/0086204 A1 | 4/2005 | Coiera et al. |

OTHER PUBLICATIONS

"OnlineHobbyist.com," Austin American Statesman, Austin, Texas, Sep. 11, 2000, p. E.1 (proquest), 1 page.

"SAP Customers Worldwide Exploit New Business Opportunities With Web-Based Real-Time Business Solutions," (Business Wire. New York, Dec. 8, 1998, p. 1) (proquest), 4 pages.

3Com Palm VII Wireless Access Now Available for the project Gateway Enterprise Project Management System, Business Editors/High-Tech Writers, Business Wire, New York, Oct. 26, 1999 (proquest), 2 pages.

Edward Weinberger et al., "Computers in Radiology: MyPACS.net: A Web-Based Teaching File Authoring Tool," The American Journal of Roentgenology, Sep. 2002, Issue 179, pp. 579-582.

Joao Cavalcanti et al., "A Logic-Based Approach for Automatic Synthesis and Maintenance of Web Sites," SEKE 2002, ACM, Jul. 15-19, 2002, pp. 619-626.

Petra Schubert et al., "Virtual Communities of Transaction: The Role of Personalization in Electronic Commerce," Global Networked Organizations, Twelfth International Bled Electronic Commerce Conference, Jun. 1999, Bled, Slovenia, pp. 1-12.

ProjectDash Drives Consistency in Communicating Project Status online Using Innovative Graphical Project Dashboard, Business Editors, Business Wire, New York, Mar. 4, 2002 (proquest), 2 pages.

Robert Neches et al., "Collaborative Information Space Analysis Tools," D-Lib Magazine, Oct. 1998, 19 pages.

Yahoo! (pages documented from the Internet Archive from Dec. 17, 2001: http://web.archive.org/web/20011217201239/http://group.yahoo.com/; http://web.archive.org/web/2001121700856/help.yahoo.com/help/groups/; http://web.archive.org/web/20011202071303/help.yahoo.com/help/us/groups/groups-01.ht...; http://web.archive.org/web/20011202072641/help.yahoo.com/help/us/groups/groups-23.ht...; http://web.archive.org/web/20011127132338/dir.groups.yahoo.com/dir/Hobbies_Crafts/...; http://web.archive.org/web/20011125123443/dir.groups.yahoo.com/dir/Hobbies_Crafts/...; http://web.archive.org/web/200111125183404/groups.yahoo.com/group/pencil-sharpeners; http://web.archive.org/web/200111217203233/http://people.yahoo.com/), 9 pages.

* cited by examiner

SYSTEM AND METHODS FOR USER-CUSTOMIZABLE ENTERPRISE WORKFLOW MANAGEMENT

CROSS REFERENCE TO RELATED APPLICATIONS

This application claims the benefit of priority from U.S. Provisional Application entitled "Personal Procedure Agent," filed May 16, 2003, Application Ser. No. 60/471,298, and claims the benefit of priority from U.S. Provisional Application entitled "User Productivity Suite," filed Dec. 23, 2002, Application Ser. No. 60/436,219.

BACKGROUND

The following description relates to information management, for example, techniques for linking work-related guided procedures with work items.

Knowledge sharing is considered a relatively important tool for a user to achieve a high level of productivity. Many users of conventional business systems may find it difficult to access information and/or tools required to perform a task. For example, the most relevant knowledge required by a user may be stored in documents, or in the head of another user or employee. Moreover, even if a user finds the information it is typically difficult to start an effective collaboration to perform a task or project. For example, administrative assistants may need to coordinate several activities to prepare for a customer visit, or a manager may need to access multiple information sources to complete a compensation plan for one or more user, etc. These type of activities may involve a relatively large number of tasks to complete, sometimes in a specific sequence and/or combination. Regardless of whether the tasks need to be completed regularly (e.g., daily, weekly) or just occasionally, a user of a database system may need to access several executable tools (e.g., executable applications) and retrieve information from various sources (e.g., data stored on a computer, or computer network). In a conventional work system, many tools and/or processes may have only one owner. Therefore, when multiple participants require that tool and/or process to complete a task, it is important that participants of a team are able to collaborate. Moreover, the tracking of completion of activities related to a collaborative project is important to ensure that all tasks related to the project are processed and completed in a timely fashion.

SUMMARY

The present application describes systems and techniques relating to providing a user the ability to trigger one or more guided procedures associated with work-items. In particular, these techniques include a user interface for displaying a work item received by a user. The work items can include metadata that describes one or more suggested procedures that should or can be initiated by the user upon receipt (or acting on) the received work item. That is, based on the metadata contained in the work item, receipt of a work item can trigger one or more guided procedures. These guided procedures can be presented to the end user as suggestions or as multiple alternatives from which the user can select. In some embodiments, it might be beneficial to make the triggering of one or more guided procedures mandatory (not user over-ridable) and/or transparent to the user. Alternatively, or in addition, the user can maintain a set of customizable rules for initiating procedures upon receipt or activation of a particular type of work item. These optional user-customizable rules can supplement, selectively override, or entirely take the place of the procedure-defining metadata attached to the work item.

In one aspect, a user interface is provided having a user-selectable list of work-items. Each work-item has metadata describing a predefined user-selectable list of guided procedures associated with the work-item. Upon receiving a response that includes a selected work-item and selected guided procedures, the selected guided procedures associated with the selected work-item can be triggered.

The list of guided procedures may be implemented as one or more optional guided procedures that the user can select or one or more mandatory guided procedures that the user must select. The predefined list of guided procedures may be replaced entirely based on one or more user-customizable rules, overriding the predefined list of guided procedures based on one or more user-customizable rules, or replacing the predefined list of guided procedures based on one or more user-customizable rules. The rules may include a rule to forward a particular work-item from one user to another user. The user-interface may provide metadata that includes information related to the work item. A guided procedure may include a series of one or more steps in a work-flow. A work item may include at least one of a step, block, and a phase associated with a guided procedure. Communication with cross-functional applications of an enterprise management consolidation system also may be allowed.

In another aspect, an enterprise management consolidation system includes a cross-functional application to provide communication between at least one of an object modeling tool, a process modeling tool, and a user interface tool. The process modeling tool is configured to manage a relationship between guided procedures and work items, and the user interface tool is configured to interact with the modeling tool, e.g., by presenting the user-selectable list of work items and providing metadata related to the work items.

The disclosed techniques may provide one or more of the following advantages. In one embodiment, the techniques may allow in-box items to be linked with guided procedures. For example, a work item received in a user's inbox can include metadata that describes one or more suggested procedures that should or can be initiated by the user upon receipt (or acting on) the received work item. In other words, receipt of a work item in a user's inbox can, based on the metadata contained in the work item, trigger one or more guided procedures. These guided procedures can be presented to the end user as suggestions or as multiple alternatives from which the user can select. In some embodiments, it might be beneficial to make the triggering of one or more guided procedures mandatory (not user over-ridable) and perhaps transparent to the user. Alternatively, or in addition, the user can maintain a set of customizable rules for initiating procedures upon receipt or activation of a particular type of work item. These optional user-customizable rules can supplement, override, or entirely take the place of the procedure-defining metadata attached to the work item.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to providing a user a list of work items linked with guided procedures and triggering one or more guided procedures based on a user selection.

Figure 1:
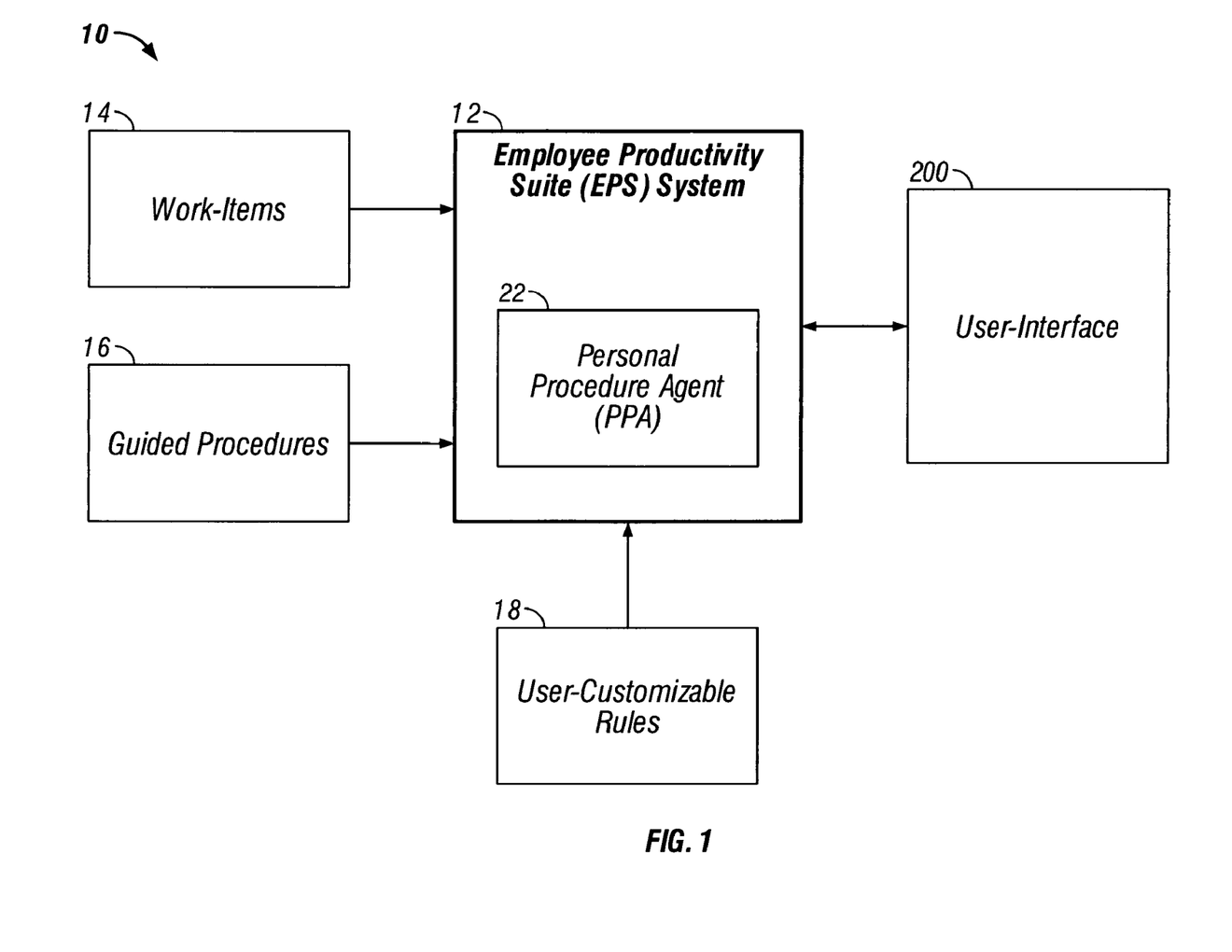
FIG. 1 shows a block diagram of a computer system having a personal procedure agent.

FIG. 1 shows a block diagram of a computer system 10 that includes an employee productivity suite (EPS) system 12 employing a personal procedure agent (PPA) 22 according to an embodiment of the present invention. The PPA 22 can include hardware and/or software components to establish a link between work items 14 and guided procedures 16 and provide a user-interface (UI) 200 for displaying a user-selectable list of work-items. The work-items 14 include metadata (i.e., data that describes other data) describing a predefined user-selectable list of guided procedures associated with each of the work-items. For example, a work item can include a request requiring an employee to take some action such as a request to purchase items (e.g., books) for an enterprise. The PPA 22 provides a link between this work-item (request) and one or more predefined guided procedures that may include process steps and/or actions to perform the request or task of purchasing the items. The guided procedures 16 may be optional or mandatory depending on the nature of the work item. The PPA 22 also allows a user to manage user-customizable rules 18 including user defined rules or procedures for overriding, supplementing or replacing predefined guided procedures associated with work items. The PPA 22 controls the UI 200 including processing responses from a user selecting a work-item and guided procedures and triggering the selected guided procedures associated with the selected work-item.

The EPS system 12 can be implemented as one or more computers including a client/server configuration. In one embodiment, the EPS system 12 can be configured as a server computer coupled to one or more client computers over the Internet with each client computer having a portal interface with a UI 200 in the form of one or more Web-pages. The Web-pages can include an "inbox" page that provides the user a display of tasks assigned to the user and the ability to track the tasks. The data employed by the EPS system 12, such as work-items 12, guided procedures 16 and user-customizable rules 18, can be stored and accessed in one or more storage mechanisms such as databases. The EPS system 12 can be configured to operate over communications channels such as the Internet, Intranet, the World-Wide-Web, or other communications channels.

Figure 2:
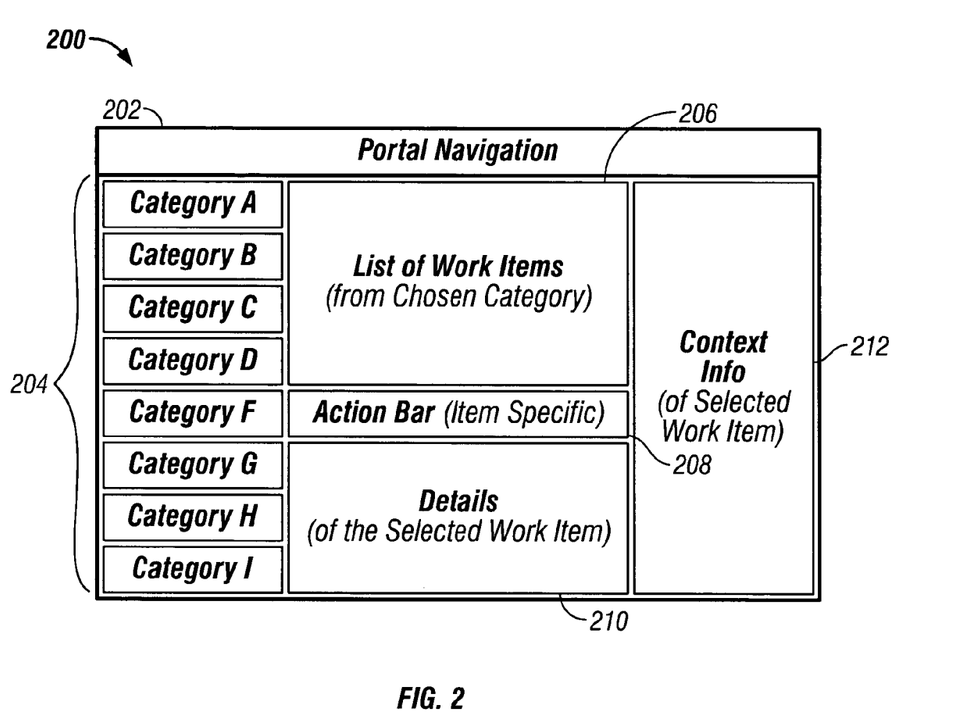
FIGS. 2 and 3 are examples of a user-interface for a personal procedure agent.

FIG. 2 is an implementation of a UI 200 of a PPA 22 according to an embodiment of the application. The EPS 12 system provides a UI 200 to display and allow a user to interact with work items including context specific information related to work items and corresponding guided procedures. For example, in one embodiment, the UI 200 includes a navigation area 202, a categories area 204, a list of work items area 206, an action bar area 208, a details area 210, and a context information area 212. The navigation area 202 provides the user the ability to link to other screens. For example, in one embodiment, the UI 200 can be a Web-page as part of portal interface where the navigation area 202 can provide the user the ability to navigate to other Web-pages.

The categories area 204 provides a display area for separating work items into different categories which can be defined by work item providers (such as a source of guided procedures). The user can select one or more of the categories listed in the categories area 204. The list of work items 206 displays a list of work items associated with the category the user selected from the category area 204. The action bar area 208 displays guided procedures associated with the selected work item form the list of work items area 206. The user can select a guide procedure from the action bar area 208 to trigger or instantiate the selected guided procedure. The details area 210 displays detailed information related to the work item selected from the list of work items areas 206. This detailed information can include information such as text (e.g. detailed text description of the work item), application forms (e.g., Word Processor document), applications (e.g., Word processor program), or other information. The context information area 212 provides information related to the context of selected work item from the work item list 206. This can include, for example, the origin or the sender of the work item (e.g. for a task of a guided procedure, it could be a link to the procedure, or the owner of the procedure).

Figure 3:
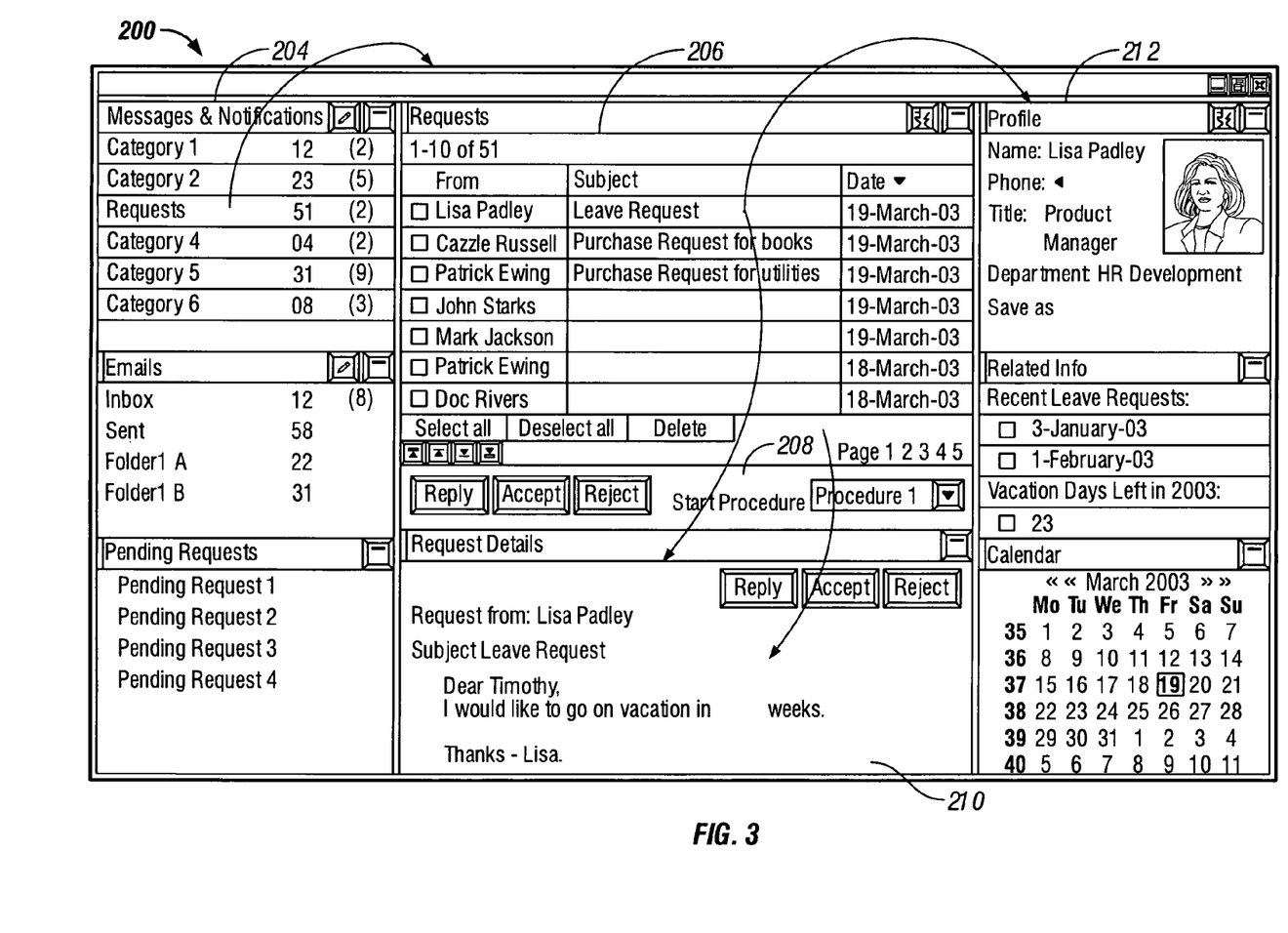

FIG. 3 is an implementation of an UI 200 of a PPA 12 according to an embodiment of the application. The UI 200 provides an "Inbox" screen of work items allowing the user to track and interact with work items. The categories area 204 is divided into three categories: "Messages and Notifications", "Emails", and "Pending Requests." The user can select from any of these categories as well as sub-categories associated with each category. In this example, the user has selected the third sub-category in the "Messages and Notifications" category which indicates that 51 requests are pending in this sub-category. The selected work items associated with this selected sub-category are displayed (shown by the arrow) in the list of work items area 206. In this example, the list of work items area 206 shows a partial list of the 51 pending requests from the selected sub-category. The work items area 206 includes a "From" column indicating the source of the request, a "Subject" column describing the subject of the request and a "Date" column indicating the receipt date of the request. The user can select any of the work items to determine the status of the item or whether some action is required. In this example, the user has selected the first request entitled "Leave Request" under the "Subject" column. The "Leave Request" refers to a request from an employee to take time off from employment. Such a request may require some actions to be taken by other personnel such as checking if the employee is eligible to take time off. Thus, the organization may have established one or more guided procedures to assist personnel in handling and tracking such a task (work item).

As a result, the action bar area 208 displays a list of guided procedures associated with the selected work item "Leave Request." The action bar 208 provides the user with the ability to "Reject", "Accept", or "Reply" to the list of guided procedures shown in the action bar. If the user selects the "Accept" option, then the selected guided procedure in the action bar 208 is initiated. On the other hand, if the user selects the "Reject" option, then one or more user-customizable rules can supplement, override, or replaced any of the predefined guided procedures shown in the action bar 208. For example, the user can have a rule that causes a work item "Leave Request" to be forwarded to another user for further processing. The details area 210 shows details of the selected work item "Leave Request" such as the sender of the request, the subject of the request as well as any text message accompanying the work item. The contents of the context information area 212 may depend on the nature of the work item. In this example, the area 212 shows information related to the work item "Leave Request" such as the "Profile" of the sender of the work item, "Related info" such as dates relevant to the task, and a "Calendar" to assist the user in handling the task of "Leave Request" for the employee.

Figure 4:
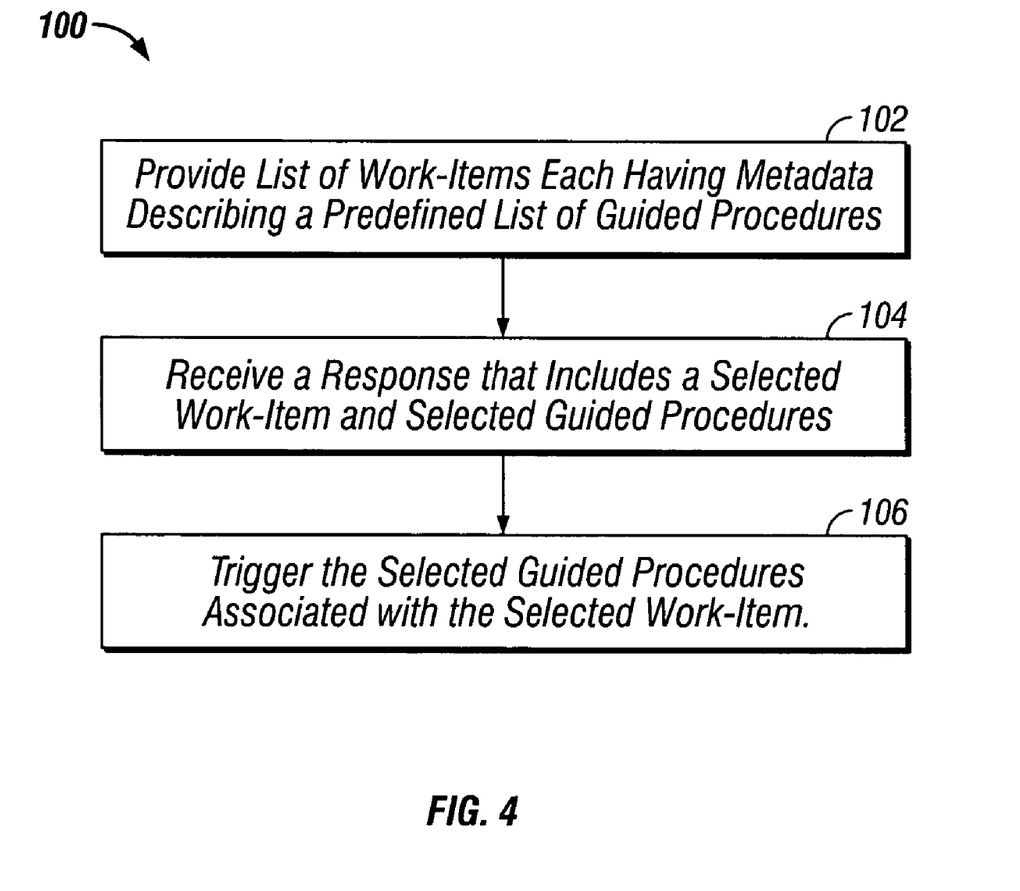
FIG. 4 is a flowchart showing a process for implementing a personal procedure agent.

FIG. 4 is a flowchart 100 showing a process for a personal procedure agent 12 according to an embodiment of the application. The PPA 12 provides (102) a list of work-items each having metadata describing a predefined list of guided procedures. For example, FIG. 3. shows UI 200 that includes a list of work items 200. The work items can include metadata that describes one or more suggested procedures that should or can be initiated by the user upon receipt (or acting on) the received work item. In addition, one or more guided procedures may be mandatory (not user over-ridable) and perhaps transparent to the user. Alternatively, or in addition, the user can maintain a set of customizable rules for initiating procedures upon receipt or activation of a particular type of work item. These optional user-customizable rules can supplement, override, or entirely take the place of the procedure-defining metadata attached to the work item. For example, a rule can indicate that upon receipt of a particular work item, the work item should be forwarded to another user.

The PPA 12 receives (104) a response that includes a selected work-item and selected guided procedures. Once the PPA 12 receives a response, the PPA 12 triggers (106) the selected guided procedures associated with the selected work-item. That is, receipt of a work item can, based on the metadata contained in the work item trigger one or more guided procedures. These guided procedures can be presented to the end user as suggestions or as multiple alternatives from which the user can select. In some embodiments, triggering may involve initiating one or more guided procedures including one or more work items to be sent to other users who may be responsible for performing tasks associated with the work item. For example, a "Leave Request" work item for an employee may include triggering a guided procedure requiring tasks to be performed by different people such as the manager of the employee (e.g., check whether the employee has any work related deadlines that may be affected by taking time off) and a human resources personnel (e.g., check if the employee is eligible to take time off) as well as payroll personnel (e.g., adjust the employee's payroll records). Thus, the work item received by one user may trigger one or more work items to be sent to other users responsible for performing these tasks, requiring collaboration among many users to accomplish these tasks.

Figure 5:
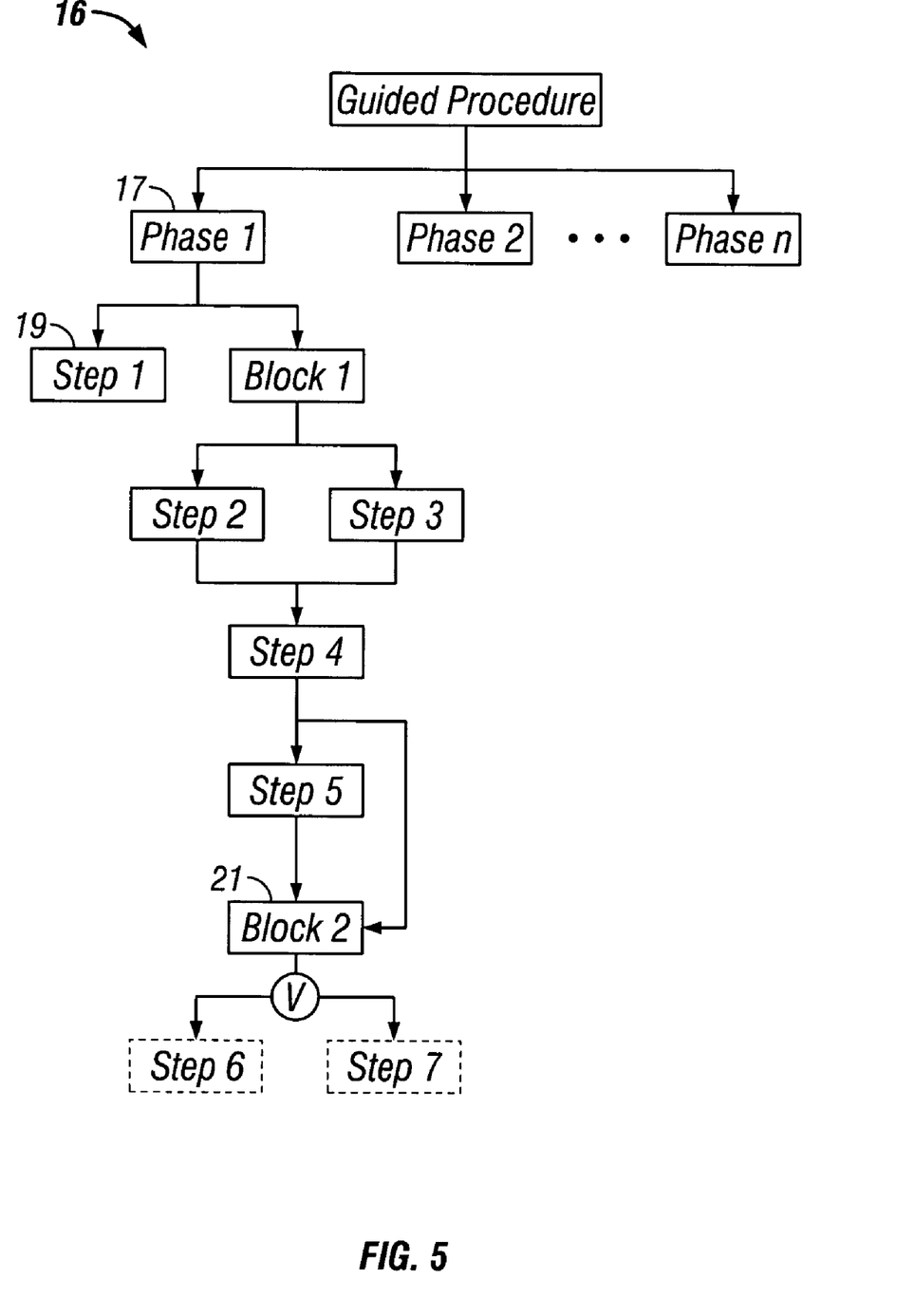
FIG. 5 is a diagram of a guided procedure architecture.

FIG. 5 is a diagram of guided procedure architecture 16 according to an embodiment of the application. A guided procedure 16 is defined using a process flow model including phases 17, steps 19 and flow blocks 21) The guided procedure also is defined by a process context and a team formed by all users associated with a specific process. Actions may be linked between the process flow model and a data context. The data context may include semantic information as well as input (resources) and output (deliverables) that will be needed or created during the execution of the corresponding procedure step.

The process flow model describes how the process steps are dependent on each other. The process flow is described in terms of phases, flow blocks and steps. Phases are used to define a sub-structure of the flow. Each phase has an owner and consists of flow blocks and steps. A flow block contains steps that are to be executed either in sequence or in parallel. Another flow block type provides a way to define alternative steps that will lead to a dynamic choice at runtime. The system may assist the user through context awareness by either automatic selection or recommendation. Steps are the lowest structure in a guided procedure. An owner is defined for each step. The owner is responsible for the completion of the step. The steps can be either mandatory or optional. An action is assigned for each step.

An action defines what is to be performed in a procedure step. This actually models a process step by linking the process flow to the process context. It can be reused within different guided procedures. It is defined with a workflow pattern, an application/service link, a context-aware list of needed resources (input, parameters), a context-aware list of deliverables (output), and a list of contributors as well as primary objects.

In an embodiment, a guided procedures architecture may include an engine (e.g., a set of executable code) that may be executed to standardize a business process(es) and/or a work procedure(s). In more detail, the guided procedure architecture may include a code that may be used to perform modeling of a process of business workflow and/or ad hoc collaborative workflow (e.g., between multiple participants on a common project or set of data). The guided procedure architecture may include code that may be performed to determine a data context and determined actions that may be performed to gather additional context or perform services. The modeling of a process may include determining action patterns, e.g., for modeling a micro-process(es) associated with an input, output, contributors, and/or a resource(s). The modeling of a process may include the use of a resource template(s) that defines an object class and/or a constraint(s) of a resource(s).

In one embodiment, referring to FIG. 5, a guided procedure is shown that includes a sequence of phases including Phase 1, Phase 2 and Phase n where "n" refers many phases. At the next level, Phase 1 further includes Step 1, Block 1 and Block 2. At still the next level, Block 1 is further subdivided into Step 2 through Step 5 and Block 2 is further subdivided into Step 6 and Step 7. Sequential steps have to be executed one after the other. In this example, Step 2 and Step 3 have to be completed before the user can start Step 4. Parallel steps can be executed at the same time. For example, a person can work on Step 2 or Step 3 depending on the personal preferences of the users. This can also be thought of as two people working at the same time in parallel. In this example a user processes Step 2 and another user processes Step 3. Both Steps have to be completed, before the process can be continued. Alternative steps (e.g., Step 6 and Step 7) provide the possibility that only one of steps have to be executed. The symbol "V" shown between Step 6 and Step 7 represents the logical "or" operation. Thus, the user can perform either Step 6 or Step 7.

There are two ways of deciding, which step has to be performed: the first possibility is, that the system decides at runtime, which step will be shown to the user. For example, one step will be proposed if a manager is processing the guided procedure; on the other hand another employee would receive a different step to execute. Both of them won't see that there is an alternative step in the guided procedure. The other possibility is, that at runtime the user can dynamically decide, which step the user chooses to execute. As soon as the user has completed one step, the guided procedure/workflow continues with the next step.

As mentioned above, an action defines what is to be performed in a procedure step. This actually models a process step by linking the process to the process context. It can be reused within different guided procedures. In one embodiment, an action is defined by application/service launch information, a context-aware list of needed resources and input parameters, a context-aware list of deliverables (output), a list of contributors, and primary objects.

Application/Service Launch Information can include information such as a uniform resource locater (URL) to the embedded application or service that has to be started for executing this action. The URL can be parameterized and is calculated at runtime with the help of a system landscape service, where the systems, applications and services are registered, and of the guided procedures context service for filling the parameters. For every step state (that the action is assigned to) a special service may be called. Four step relevant states for service selection can be defined: step not yet active, step active but not yet executed, step already executed but still repeatable (no dependencies on this step have been used in the process further execution yet), step already executed but not repeatable (other dependent steps have already been executed, e.g. approval on this step). Every action service entry has a type that defines the kind of service or application that is launched or executed. An action service entry may launch components such as web services or other types of service entries.

Resources and Input Parameters refer any business object (e.g. cost center, customer, sales order) or parameter needed for the execution of the action. These parameters or objects can be accessed by the embedded application through parameter passing in the URL or through the guided procedures context service (data sharing and evening). They can be set at procedure design-time, procedure instantiation time or dynamically at runtime.

The guided procedures concept can be integrated with searching tools such as Resource Finder for searching and getting resources to fill the resource parameters. A Resource Finder is a service implementing a certain application program interface (API) and that can be integrated within guided procedures for searching and getting access to resource (business object) instances or collections of instances. The appropriate Resource Finder is selected according to the Resource Template set on this resource entry and will take into account this template for resource selection criteria (e.g. <select a room> will bring up the room finder, <select a person> will bring up the people finder etc.). The Resource Finder is fed by the users profile, where typical data is held (my boss, my team assistant, the rooms I am responsible for, my favorite hotel . . . ). A parameter field is pre-populated with the object last used by the processor for that object type, but surely can be changed according to current needs.

All resources defined for the action are available in the procedure context, i.e. the resource values can be automatically set by the system at runtime or referenced later in the process. If some resource values are not known at runtime when the action has to be executed, a selection screen with context information (resources with missing values) is shown before any service/application is called.

Resource Templates can be user to specify an action resource. The corresponding resource finder will take this template into account to restrict the search according to the constraints described in the template (selection criteria). Resource templates describe specific resources (single or collection) needed in actions, e.g. <pick meeting room>, <book table for lunch>, <schedule conference call>, <find keynote speaker>. Preferred resources can be stored as frequently used or personalized resources—e.g. my project team, our meeting room, my trusted architects. Some resources can be predefined in the user context—e.g. my boss, my office admin, my approver and my group. A Resource Template can be defined in the following way: the Resource Class determines the type of resource (e.g. people, room, sales order, customer, hotel); the Resource Attributes define constraints when searching for resources. As a response to Resource Templates the appropriate search tool is launched, i.e. the corresponding Resource Finder.

Deliverables and Output Parameters refer to the result of an action. They are available in the Procedure Context and can be tracked during their life cycle, i.e. a user can monitor the deliverables in a guided procedure and be notified by any event such as deliverable change, availability or approval. Moreover the whole process in getting the deliverable—i.e. user interactions, such as messaging, leading to the deliverable—can also be monitored. This is enabled through an API allowing the applications to report some information back to guided procedures about the work done in the corresponding guided procedure instance.

There is a possibility to lock special deliverables, like documents. For example, if a document is sent to the manager to be approved, it is necessary to lock this document so that none else can make any changes on it while waiting for the approval. After the manager has approved the document, it is also locked so that no unapproved changes can be made. If there are any mistakes in the document, it is possible to unlock the document with the approval of the manager. After the changes are made, it is locked again after the approval of the manager. Accordingly, every finished and approved document is prevented from being changed by any user without the knowledge of the responsible user.

The Contributor List is a list of people that participate in the completion of a procedure step. This list is available in the procedure context and used by the action to correspondingly assign tasks. A contributor can be assigned in the design-time (e.g. a certain person is always responsible for giving this kind of permission), while instantiating the procedure (e.g. the user knows that he usually asks a certain person to complete a certain step) or while running the procedure.

A contributor can contribute to a procedure, phase, block or single step. You can also think of steps that have subtasks done by more than one contributor in parallel as shown in the example below. These subtasks can be mandatory or optional. If the user decides to go further in his process, he can stop those optional subtasks and carry on. An example to clarify what is meant, could be an information gathering. In this example, a user can start Step 2 "gather information for our next staff outing". The user sends a request to all his colleagues for input. After a certain time receiving enough information, he decides to stop those subtasks and carries on with the process.

Primary Objects are objects or parameters with known semantics of primary importance that can be used by Guided Procedures to display some significant information. A procedure can have a primary object (e.g. a new hire procedure may have the hired employee as primary object, then those involved persons in the procedure know who to deliver the PC or phone to, who is the person, that needs the permission etc.). It should be noted that a phase, block and step can also have a primary object.

In an embodiment, a PPA 22 may include a personal rule set for a user to initiate a process based on incoming messages or a defined workflow process. The personal procedure agent may also include a personal resource page(s) that allows for the display of a "personal workspace" window. The personal workspace window may include personalized content that reflects the information needs of a user and may bundle content across several pages and/or documents. The personal workspace window may also include a display area for tracking all on-going work for a user.

Figure 6:
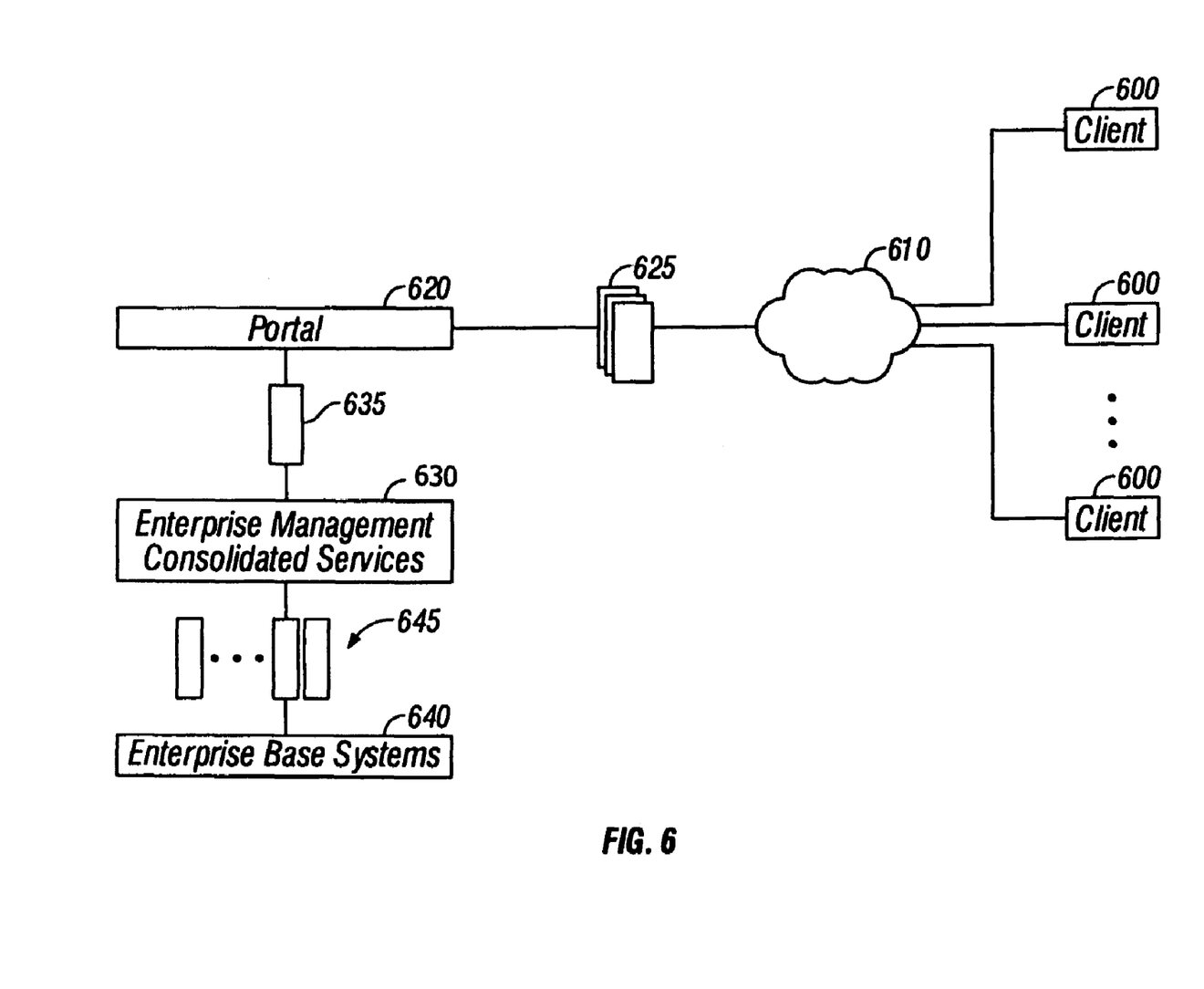
FIG. 6 is a block diagram illustrating an example of an integrated enterprise management system.

FIG. 6 is a block diagram illustrating an example integrated enterprise management system. Recent developments in enterprise management systems have attempted to integrate multiple legacy systems, typically found in existing heterogeneous information technology (IT) environments, into a common enterprise management solution. The disclosed techniques help deliver a fully integrated platform that also provides sufficient flexibility to adjust to rapidly changing enterprise environments. Multiple clients 600 can access data over a network 610 through a portal 620. The network 610 can be any communication network linking machines capable of communicating using one or more networking protocols, e.g., a local area network (LAN), a wide area network (WAN), an enterprise network, a virtual private network (VPN), and/or the Internet. The clients 600 can be any machines or processes capable of communicating over the network 610. The clients 600 can be Web Browsers and optionally can be communicatively coupled with the network 610 through a proxy server (not shown).

A portal 620 provides a common interface to program management services. The portal 620 receives requests from the clients 600 and generates information views 625 (e.g., Web pages) in response. The portal 620 can implement a user roles-based system to personalize the common interface and the information views 625 for a user of a client 600. A user can have one or more associated roles that allow personalized tailoring of a presented interface through the generated information views 625.

The portal 620 communicates with an enterprise management system 630 that consolidates multiple application services. The portal 620 receives data 635 from the enterprise management system 630 for use in fulfilling the requests from the clients 600. The enterprise management system 630 can provide integrated application services to manage business objects and processes in a business enterprise. The business objects and processes can be resources (e.g., human resources), development projects, business programs, inventories, clients, accounts, business products, and/or business services.

The enterprise management system 630 communicates with enterprise base systems 640 to obtain multiple types of data 645. The enterprise base systems 640 can include various existing application services, such as human resource management systems, customer relationship management systems, financial management systems, project management systems, knowledge management systems, business warehouse systems, time management systems, and electronic file and/or mail systems. The enterprise base systems 640 also can include an integration tool, such as the exchange Infrastructure provided by SAP, that provides another level of integration among base systems. The enterprise management system 630 can consolidate and integrate the data and functionality of such systems into a single enterprise management tool.

This enterprise management tool can include systems and techniques to facilitate creation of new applications within the enterprise management system 630. These new applications, referred to as cross-functional or composite applications, can readily draw on the resources of the enterprise base systems 640 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 630 using customized cross-functional applications. The stages can provide and consume determined services that can be integrated across multiple disparate platforms.

The portal 620, enterprise management system 630 and enterprise base systems 640 can reside in one or more programmable machines, which can communicate over a network or one or more communication busses. For example, the base systems 640 can reside in multiple servers connected to an enterprise network, and the portal 620 and the enterprise management system 630 can reside in a server connected to a public network. Thus, the system can include customized, web-based, cross-functional applications, and a user of the system can access and manage enterprise programs and resources using these customized web-based, cross-functional applications from anywhere that access to a public network is available.

Figure 7:
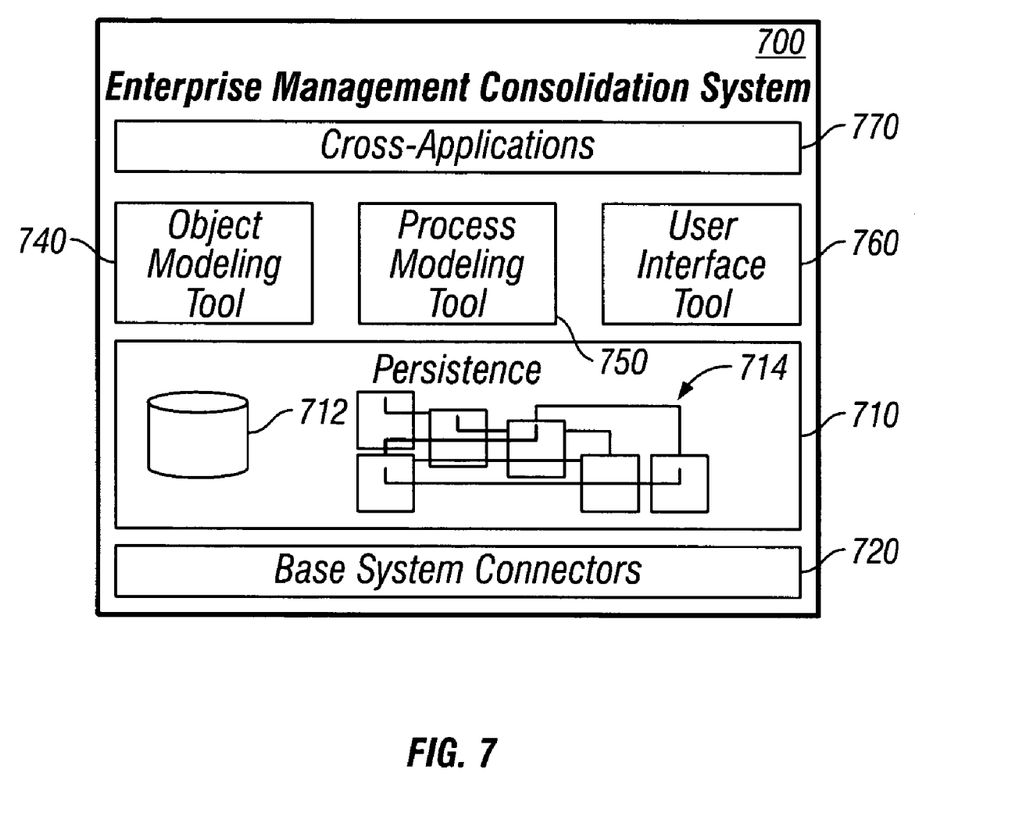
FIG. 7 is a block diagram illustrating components of an example enterprise management consolidation system.

FIG. 7 is a block diagram illustrating components of an example enterprise management consolidation system 700. The system 700 can include a persistence layer 710 and one or more base system connectors 720. The base system connectors 720 enable data exchange and integration with base systems. The base system connectors 720 can include a BC (Enterprise Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 710 provides the enterprise management consolidation system 700 with its own database 712 and data object model 714. The database 712 and the object model 712 provide a consolidated knowledge base to support multiple enterprise management functions, including functions created as cross-applications 770. Active communication between the persistence layer 710 and the base systems can provide a tight linkage between real-time operational data from multiple base systems and an integrated enterprise analysis tool to allow strategic enterprise management and planning.

The data object model 714 can represent a subset of data objects managed by the base systems. Not all of the data aspects tracked in the base systems need to be recorded in the data object model 714. The data object model 714 may have defined relationships with data objects stored in the base systems, for example, certain objects in the data object model 714 may have read-only or read-write relationships with corresponding data objects in the base systems. These types of defined relationships can be enforced through the communication system built between the persistence layer 710 and the base systems. Thus, the persistence layer 710 can be used to effectively decouple application development from the underlying base systems.

The cross-functional applications 770, which take advantage of this decoupling from backend systems to drive business processes across different platforms, technologies, and organizations, can be created using a set of tools that enable efficient development of cross-functional applications 770. The cross-functional applications 770 can support semi-structured processes, aggregate and contextualize information, handle event-driven and knowledge-based scenarios, and support a high degree of collaboration in teams, including driving collaboration and transactions. The set of tools enable efficient development of the cross-functional applications 770 by providing application patterns that support model-driven composition of applications in a service-oriented architecture.

An object modeling tool 740 enables creation of new business objects in the persistency layer 710 by providing a mechanism to extend the data object model 714 dynamically according to the needs of an enterprise. A process modeling tool 750 enables creation of new business workflow and ad hoc collaborative workflow. A user interface (UI) tool 760 provides UI patterns that can be used to link new objects and workflow together and generate standardized views into results generated by the cross-functional applications 770. The object modeling tool 740, the process modeling tool 750 and the UI tool 760 thus can be used to build the components of cross-applications 770 to implement new enterprise management functions without requiring detailed coding activity.

The process modeling tool 750 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be made trackable by the process owner or by involved contributors using a dashboard that displays highly aggregated data. The dashboard and a myOngoingWork place can be two UI patterns that are provided by the UI tool 760.

Whenever there is a concept of myObjects, myRecentObjects, myRelatedObjects or myPreferredObjects, then an Object Picker UI pattern, provided by the UI tool 760, can be included that let users pick their favorite object directly. Whenever people are to be searched for, either for choosing one individual person or for generating a collection of people meeting some criterion, the people finder concept should be applied. A key aspect of searching for a person can be described as an attribute within the user's activity, qualification, interest, and collaboration profile. For a given cross-application scenario, people collections can be stored as personal or shared collections using the People Finder to make them available for further operations later on.

Whenever there is a strategic view on a cross-functional application scenario, analytics of the overall portfolio can be made available in the form of a collection of UI components. A view selector can be used to display/hide components, and a component can be toggled between graphical and numerical display and can include a drop-down list or menu to select sub-categories or different views.

Cross-functional application scenarios can provide related information to the user when possible, and some parts within a larger cross-application scenario can define what kind of related information is to be offered. Heuristics can be used to identify such relatedness, such as follows: (1) information that is related to the user due to explicit collaborative relationships such as team/project membership or community membership; (2) information that is similar to a given business object in a semantic space based on text retrieval and extraction techniques; (3) recent objects/procedures of a user; (4) other people doing the same or similar activity (using same object or procedure template, having same workset); (5) instances of the same object class; (6) next abstract or next detailed class; (7) explicit relationships on the organizational or project structure; (8) proximity on the time scale; (9) information about the underlying business context; and/or (10) information about the people involved in a collaborative process.

Cross-functional applications also can include generic functionality in the form of ControlCenter Pages that represent generic personal resources for each user. These cross-applications can refer to the following pages where appropriate: (1) MyOngoingWork page: provides instant access to all dashboards that let users track their ongoing work. Ongoing work may refer to the state of business objects as well as guided procedures. (2) MyDay page: lists today's time based events that are assigned or related to the user. (3) MyMessageCenter page: Displays all pushed messages and work triggers using a universal inbox paradigm with user selected categorical filters. (4) MyInfo: Provides access to all personal info collections (documents, business objects, contacts) including those located in shared folders of teams and communities of which the user is a member. The disclosed techniques can also be part of the cross-functional applications for providing a MyInbox page for managing guided procedures and work items related to the guided procedures. Also provides targeted search in collaborative information spaces such as team rooms, department home pages, project resource pages, community sites, and/or personal guru pages.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), a personal area network ("PAN"), a mobile communication network, and/or the Internet.

The computing system can include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. The logic flows depicted in FIG. 4 does not require the particular order shown, or sequential order, to achieve desirable results. In certain implementations, multitasking and parallel processing may be preferable.

Other embodiments may be within the scope of the following claims.

What is claimed is:

1. A method comprising:
   providing a user-interface having a user-selectable list of work-items, each work-item having metadata describing a predefined user-selectable list of guided procedures associated with the work-item;
   receiving a selected work-item and one or more selected guided procedures; and
   triggering the selected guided procedures associated with the selected work item,
   wherein each guided procedure includes a series of steps in a work-flow that are to be executed in parallel by a plurality of users collaborating on a project, and an owner is defined for one or more steps and responsible for completing the steps assigned to the owner.

2. The method of claim 1 wherein the list of guided procedures includes one or more optional guided procedures that the user can select.

3. The method of claim 1 wherein the list of guided procedures includes one or more mandatory guided procedures that the user must select.

4. The method of claim 1 further comprising supplementing the predefined list of guided procedures based on one or more user-customizable rules.

5. The method of claim 1 further comprising overriding the predefined list of guided procedures based on one or more user-customizable rules.

6. The method of claim 1 further comprising replacing the predefined list of guided procedures based on one or more user-customizable rules.

7. The method of claims 4, 5, or 6, wherein the rules include a rule to forward a particular work-item from one user to another user.

8. The method of claim 1 further comprising providing on the user-interface metadata that includes information related to the work item.

9. The method of claim 1 further comprising communicating with cross-functional applications of an enterprise management consolidation system.

10. The method of claim 1 further comprising:
    selecting the one or more steps to be performed at runtime; and
    automatically distributing the one ore more steps to their assigned owners.

11. A system comprising:
    a data source of guided procedures and work-items; and
    a computer having access to the data source, the computer operative to perform operations comprising:
      providing a user-interface with a user-selectable list of work-items, each work-item having metadata describing a predefined user-selectable list of guided procedures associated with the work-item;
      receiving a selected work-item and one or more selected guided procedures; and
      triggering the one or more selected guided procedures associated with the selected work-item,
      wherein each guided procedure includes a series of steps in a work-flow that are to be executed in parallel by a plurality of users collaborating on a project, and an owner is defined for one or more steps and responsible for completing the steps assigned to the owner.

12. The system of claim 11 wherein the list of guided procedures includes one or more optional guided procedures that the user can select.

13. The system of claim 11 wherein the list of guided procedures includes one or more mandatory guided procedures that the user must select.

14. The system of claim 11 further comprising supplementing the predefined list of guided procedures based on one or more user-customizable rules.

15. The system of claim 11 further comprising overriding the predefined list of guided procedures based on one or more user-customizable rules.

16. The system of claim 11 further comprising replacing the predefined list of guided procedures based on one or more user-customizable rules.

17. The system of claim 14, 15, or 16 wherein the rules include a rule to forward a particular work-item from one user to another user.

18. The system of claim 11 further comprising providing on the user-interface metadata that includes information related to the work item.

19. The system of claim 11 further comprising communicating with cross-functional applications of an enterprise management consolidation system.

20. The system of claim 11 wherein the one or more steps to be performed are selected at runtime and automatically distributed to their assigned owners.

21. An article comprising a machine-readable medium storing instructions operable to cause one or more machines to perform operations comprising:
    providing a user-interface with a user-selectable list of work-items, each work-item having metadata describing a predefined user-selectable list of guided procedures associated with the work-item;
    receiving a selected work-item and one or more selected guided procedures; and
    triggering the one or more selected guided procedures associated with the selected work-item, wherein each guided procedure includes a series of steps in a work-flow that are to be executed in parallel by a plurality of users collaborating on a project, and an owner is defined for one or more steps and responsible for completing the steps assigned to the owner.

22. The article of claim 21 wherein the list of guided procedures includes one or more optional guided procedures that the user can select.

23. The article of claim 21 wherein the list of guided procedures includes one or more mandatory guided procedures that the user must select.

24. The article of claim 21 further comprising supplementing the predefined list of guided procedures based on one or more user-customizable rules.

25. The article of claim 21 further comprising overriding the predefined list of guided procedures based on one or more user-customizable rules.

26. The article of claim 21 further comprising replacing the predefined list of guided procedures based on one or more user-customizable rules.

27. The article of claim 24, 25, or 26 wherein the rules include a rule to forward a particular work-item from one user to another user.

28. The article of claim 21 further comprising providing on the user-interface metadata that includes information related to the work item.

29. The article of claim 21 further comprising communicating with cross-functional applications of an enterprise management consolidation system.

30. The article of claim 21 wherein the one or more steps to be performed are selected at runtime and automatically distributed to their assigned owners.

31. An enterprise management consolidation system comprising:
   a cross functional application to provide communication between at least one of an object modeling tool, a process modeling tool, and a user interface tool, wherein the process modeling tool is configured to manage a relationship between guided procedures and work items, and the user interface tool includes instructions stored in a computer readable medium, the instructions executable by a processor and comprising:
   program code for providing a user-interface with a user-selectable list of work-items, each work-item having metadata describing a predefined user-selectable list of guided procedures associated with the work-item;
   program code for receiving a selected work-item and one or more selected guided procedures; and
   program code for triggering the one or more selected guided procedures associated with the selected work-item,
   wherein each guided procedure includes a series of steps in a work-flow that are to be executed in parallel by a plurality of users collaborating on a project, and an owner is defined for one or more steps and responsible for completing the steps assigned to the owner.

32. The system of claim 31 wherein the list of guided procedures includes one or more optional guided procedures that the user can select.

33. The system of claim 31 wherein the list of guided procedures includes one or more mandatory guided procedures that the user must select.

34. The system of claim 31 further comprising supplementing the predefined list of guided procedures based on one or more user-customizable rules.

35. The system of claim 31 further comprising overriding the predefined list of guided procedures based on one or more user-customizable rules.

36. The system of claim 31 further comprising replacing the predefined list of guided procedures based on one or more user-customizable rules.

37. The system of claim 34, 35, or 36 wherein the rules include a rule to forward a particular work-item from one user to another user.

38. The system of claim 31 further comprising providing on the user-interface metadata that includes information related to the work item.

39. The enterprise management consolidation system of claim 31 wherein the one or more steps to be performed are selected at runtime and automatically distributed to their assigned owners.

* * * * *